United States Patent
Konishi et al.

(10) Patent No.: US 6,595,587 B2
(45) Date of Patent: Jul. 22, 2003

(54) STRUCTURE OF SEAT FOR VEHICLE

(75) Inventors: Tatsuya Konishi, Tokyo (JP); Tsutomu Terasaki, Tokyo (JP); Isao Sekita, Tokyo (JP)

(73) Assignees: Honda Giken Kogyo Kabushiki-Kaisha, Tokyo (JP); Tachi-S Co., Ltd., Tokyo (JP)

(*) Notice: Subject to any disclaimer, the term of this patent is extended or adjusted under 35 U.S.C. 154(b) by 21 days.

(21) Appl. No.: 09/949,727

(22) Filed: Sep. 12, 2001

(65) Prior Publication Data
US 2002/0033624 A1 Mar. 21, 2002

(30) Foreign Application Priority Data
Sep. 21, 2000 (JP) ........................... 2000-291943

(51) Int. Cl.[7] .......................... B60N 2/015; B60N 2/36
(52) U.S. Cl. ............... 297/331; 297/335; 297/336; 297/344.11; 297/481; 296/65.01; 296/65.05; 296/65.09; 296/65.13; 296/65.16; 296/69
(58) Field of Search ................. 297/331, 335, 297/336, 344.11, 378.12, 481; 296/65.01, 65.05, 65.09, 65.13, 65.16, 69

(56) References Cited

U.S. PATENT DOCUMENTS

| | | | | |
|---|---|---|---|---|
| 4,810,037 A | * | 3/1989 | Takagi | 297/481 |
| 5,009,469 A | * | 4/1991 | Mouri | 297/481 X |
| 5,044,695 A | * | 9/1991 | Tsuchiya | 297/481 |
| 5,496,088 A | * | 3/1996 | Stewart | 297/336 X |
| 5,711,505 A | * | 1/1998 | Nemoto | 297/336 X |
| 5,765,894 A | * | 6/1998 | Okazaki et al. | 297/336 X |
| 5,951,086 A | * | 9/1999 | Hoshino et al. | 297/336 X |
| 6,010,190 A | * | 1/2000 | Downey | 297/331 X |
| 6,113,187 A | * | 9/2000 | Sugiyama et al. | 297/335 |
| 6,183,033 B1 | | 2/2001 | Arai et al. | 297/331 X |
| 6,196,613 B1 | * | 3/2001 | Arai | 297/335 X |
| 6,234,574 B1 | * | 5/2001 | Hoshihara et al. | 297/336 X |
| 6,250,704 B1 | * | 6/2001 | Garrido | 297/336 X |
| 6,371,556 B1 | * | 4/2002 | Arai | 297/331 |
| 6,412,876 B2 | * | 7/2002 | Nishide | 297/481 X |
| 6,474,739 B1 | * | 11/2002 | Lagerweij | 297/378.12 X |
| 6,478,358 B1 | * | 11/2002 | Okazaki et al. | 297/336 X |

FOREIGN PATENT DOCUMENTS

| | | | | |
|---|---|---|---|---|
| EP | 614 781 A1 | * | 9/1994 | 297/336 |
| JP | 11-278117 | | 10/1999 | |

* cited by examiner

*Primary Examiner*—Rodney B. White
(74) *Attorney, Agent, or Firm*—Browdy and Neimark, P.L.L.C.

(57) ABSTRACT

A structure of vehicle seat including a seat cushion frame pivoted therein, a striker, and a lock mechanism for locking and unlocking the seat cushion frame to and from the striker. The lock mechanism is disposed in the rearward area of the seat cushion frame, while the striker is fixed on the floor of vehicle, so as to allow smooth and direct escape of a great load from the seat cushion frame via the striker to the floor. This avoids the necessity of any reinforcement leading to weight increase of the seat. Also, a seat belt is provided in the seat cushion frame together with the lock mechanism in an integral manner.

3 Claims, 4 Drawing Sheets

STRUCTURE OF SEAT FOR VEHICLE

BACKGROUND OF INVENTION

1. Field of the Invention

The present invention generally relates to a vehicle seat structure. In particular, the invention is directed to a structure of vehicle seat which is effective in withstanding a great load and also applicable to a fold-down vehicle seat which allows its seat back and seat cushion to be folded or flipped over into a full-flat seat state.

2. Description of Prior Art

Among various sorts of vehicle seats, there is known a folding or fold-down seat structure wherein a seat back frame and/or a seat cushion frame are/is foldable into a compact folded state to widen a space in a vehicle. Also, known is a full-flat type of fold-down seat structure wherein a seat back frame and a seat cushion frame are both so articulated on a base frame as to be foldable into a full-flat state where the rear surfaces of the seat back and cushion frames lie generally flush with each other to provide an enlarged floor or cargo load space in the rearward cabin region of a vehicle.

Typically, those seat structures are provided with a pair of slide rails, each comprising a lower rail fastened on a vehicle floor and an upper rail slidably fitted in the lower rail, such that the upper rail is in a locking relation with the lower rail via a lock mechanism, with a striker provided in that upper rail (as disclosed from the Japanese Laid-Open Patent Publication No. 11-278117 for example). In the full-flat type fold-down seat structure, the lower rail is disposed subjacent to the base frame, whereas the upper rail is fixedly attached to the same base frame, with a striker being provided in the upper rail. In any case, the seat cushion frame is normally provided with a seat belt and pivoted on a forward end of base frame at the forward end thereof, thereby being free to rotate or flip over in the forward direction relative to the base frame. Further, the seat cushion frame is provided with a latch at the rearward end thereof, which is adapted for releasable engagement with the striker provided in the upper rail. In the case of full-flat-type fold-down seat, its seat back frame is so pivoted on the rearward end of the base frame as to be foldable down onto the base frame.

According to such conventional seat frame structures, in a resultant upholstered vehicle seat produced therefrom, a user or passenger can release the latch provided in its seat cushion from engagement with the striker to flip over the seat cushion forwardly together with the seat belt into a reversed state where the planar rear side of seat cushion is exposed and lies generally flat. In particular, in the full-flat-type fold-down seat, the user or passenger can also fold the seat back forwardly into a reversed state upon the base frame, in which the planar rear side of the seat back is exposed and set substantially in registry with the seat cushion back side, with the result that the seat on the whole is made full flat to define a cargo load floor or load-carrying platform in the vehicle cabin.

However, the foregoing conventional seat structures, due to the seat cushion being latched to the striker provided in the slide rail, has been found defective in requiring that the slide rails themselves be greatly reinforced with its extremely increased thickness to withstand a great load input from the seat belt to the seat cushion frame when a collision or sudden deceleration occurs, which leads to an undesirable increase of the weight of seat.

To solve such problem, it has been contemplated that the anchor of seat belt is secured directly to the floor of vehicle. But, in that case, it is necessary and quite troublesome for a user or passenger to relocate the seat belt to the seat cushion every time he or she moves the seat in the fore-and-aft direction and/or flips over the seat cushion between a normal use position and a reversed flat state. This is because the seat belt will naturally fall under the seat cushion during that seat positioning/folding operation, thus making it annoyingly necessary for the user or passenger to reach out for the fallen seat belt, pick it up and put it on the seat cushion again.

SUMMARY OF THE INVENTION

With the above-stated drawbacks in view, it is therefore a primary purpose of the present invention to provide an improved structure of vehicle seat which realizes its light weight with sufficient robustness and also prevents a seat belt being fallen and missing from its seat cushion when moving and/or folding the seat.

To achieve such purpose, a structure of vehicle seat in accordance with the present invention basically comprises:

- a pair of slide rail devices including a lower rail fixed on a floor of vehicle and an upper rail slidably engaged with the lower rail;
- a base frame integrally fixed to the upper rail, which base frame has a forward end facing to a side forwardly of the seat;
- a seat cushion frame pivotally connected with the forward end of base frame such as to be rotatable forwardly and backwardly relative to that forward end, which seat cushion frame has a rearward area facing to a side rearwardly of the seat;
- a striker means fixedly provided on the floor;
- a lock mechanism for locking and unlocking the seat cushion frame to and from the striker; and
- a seat belt means;
- wherein the lock mechanism is provided in the rearward area of seat cushion frame and wherein the seat belt means is securely attached to the seat cushion frame in an integral manner together with the lock mechanism.

Accordingly, in the case of collision or sudden deceleration, a great load, applied to the seat from an occupant thereon who is restrained by the seat belt means, is imparted via the seat belt means to the seat cushion frame and quickly escaped through the lock means and striker down to the vehicle floor. Since the great load is directly exerted upon the floor or vehicle body, the seat cushion frame does not require any special reinforcement that involves a whole increased physical modification thereof, thus allowing the seat cushion frame to remain unchanged or light in weight. Also, the provision of seat belt means at the seat cushion frame insures to not only make the seat belt means readily accessible to a user or passenger even when he or she is adjusting the seat fore-and-aft position and folding the seat, but also preclude the seat belt means from being fallen down through the seat during that seat arranging work, which therefore avoids the troublesome necessity for user or passenger to find and reach out for the seat belt means fallen or missing under the seat.

It is a second purpose of the present invention to provide a seat construction which avoids an intensive exertion of the foregoing great load upon the lock mechanism and eliminates the need for reinforcing the lock mechanism itself.

For that purpose, in the seat cushion frame, there are formed a cross frame member and a longitudinal frame member extending in a direction transversely of the cross frame member, and further, firmly connected with those cross and longitudinal frame members is a vertically extending base plate to which both lock means and seat belt means are fixedly attached. Thus, the great load will be dispersed effectively into those cross and longitudinal frame members as well as the base plate, thereby avoiding an intensive load exertion on the lock mechanism and seat belt means, while simultaneously allowing direct and smooth escape of the load to the floor.

Other features and advantages of the present invention will become apparent from reading of the description hereinafter, with reference to the annexed drawings.

DETAILED DESCRIPTION OF PREFERRED EMBODIMENT OF THE PRESENT INVENTION

Referring to FIGS. 1 through 6, there is illustrated one exemplary mode of a vehicle seat structure in accordance with the present invention, which shows the case where a full-flat-type fold-down vehicle seat is provided, by way of example, in the present invention.

Figure 1:
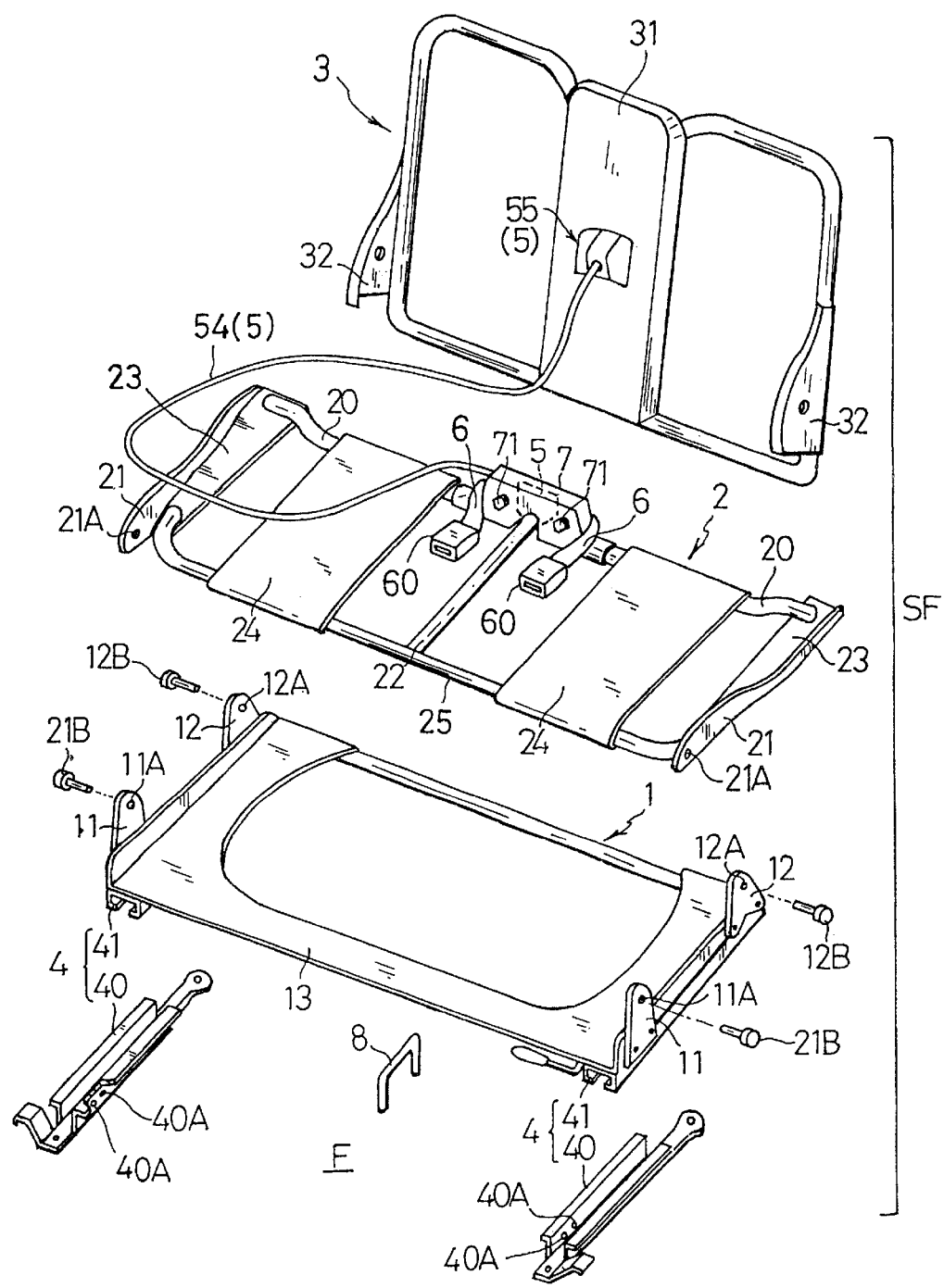
FIG. 1 is a schematic exploded perspective view of vehicle seat frame structure in accordance with the present invention.

FIG. 1 schematically shows, in the perspective, an exploded framework structure of a full-flat-type fold-down vehicle seat of the present invention. The framework structure or fold-down seat frame assembly, as generally designated by (SF), basically includes a base frame (1); a seat cushion frame (2); a seat back frame (3); and a pair of slide rail devices (4) (4). Each of the slide rail devices (4) is comprised of an upper movable rail (41) having generally inverted-U-shaped cross-section and a stationary lower rail (40) having generally "T" shaped cross-section adapted to be slidably fit in such invented "U" cross-sectional upper rail (41).

As is known, the base frame (1) itself is of an ordinary rectangular configuration, except that its inward area is cut away as seen in FIG. 1, thus defining an opened area centrally thereof. Firmly attached on the bottom side of the base frame (1) are the above-stated two upper rails (41) (41) such as to extend on and along the respective two lateral ends of base frame (1). Also, a pair of upstanding forward brackets (11) (11) are disposed forwardly of the base frame (1) such that they are firmly fastened or welded on the respective two lateral walls of base frame (1), whereas on the other hand, disposed backwardly of that base frame (1) are a pair of upstanding rearward brackets (12) (12) such that, likewise as in the forward brackets (11) they are firmly fastened or welded on the respective two lateral walls of base frame (1). With regard to the two lower rails (40) (40), they are fixed on the vehicle floor (F) in a spaced-apart parallel relation with each other, extending in a direction along the fore-and-aft direction of a vehicle body (not shown) and thus along the lengthwise direction of the vehicle floor (F). Of course, the two lower rails (40) lie fast on the floor (F), with the two upper rails (41) being slidably coupled with the two lower rails (40), respectively, thereby forming a pair of slide rail devices (4).

In accordance with the present invention, a generally inverted-U-shaped striker (8) is fixedly provided on the vehicle floor (F) and disposed centrally between the two lower rails (40), as shown in FIG. 1. The striker (8) itself orients its horizontal, longitudinal axis portion (81) (see FIG. 2) along the fore-and-aft direction of the vehicle body or floor (F).

Also, in accordance with the invention, the seat cushion frame (2) is comprised of: a forward cross frame member (25); a pair of rearward cross frame members (20) (20); a base plate (7); a lock mechanism (5) mounted on the base plate (7); a pair of side frame members (23) (23) formed from a steel plate material, which is securely connected by welding between those two cross frame members (25) (20); and a central longitudinal frame member (22) fixedly connected between the forward cross frame member (25) and base plate (7), the longitudinal frame member (22) extending longitudinally along the fore-and-aft direction of a vehicle body or the floor (F).

Figure 5:
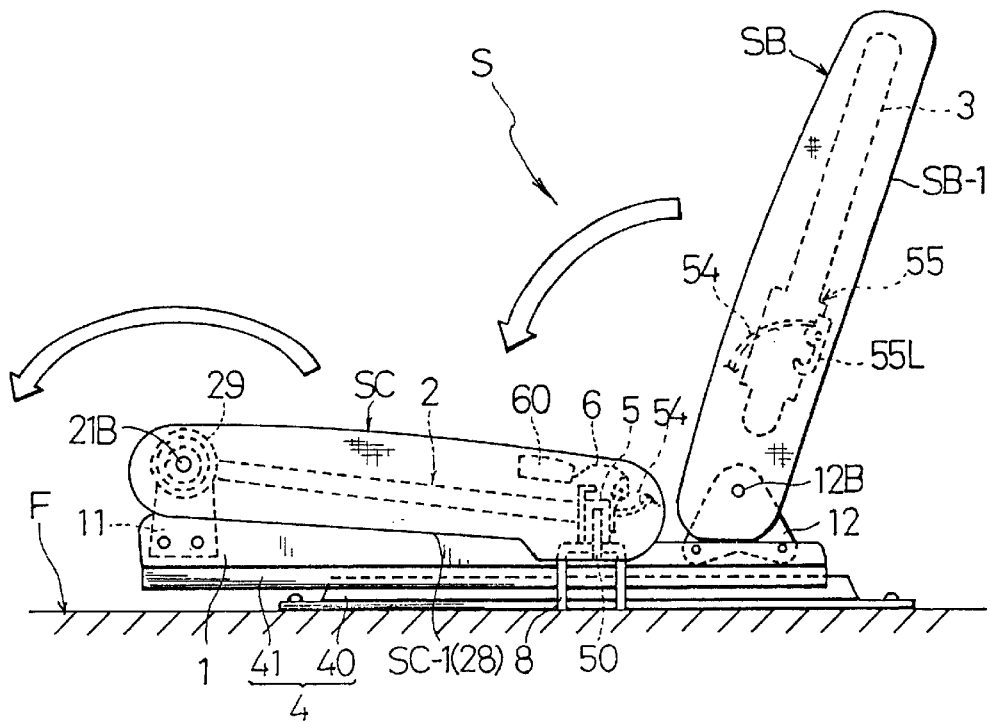
FIG. 5 is a schematic side elevation of a vehicle seat formed on the basis of the seat frame structure, which shows explanatorily how the seat cushion and seat back are folded in the forward direction.
Figure 6:
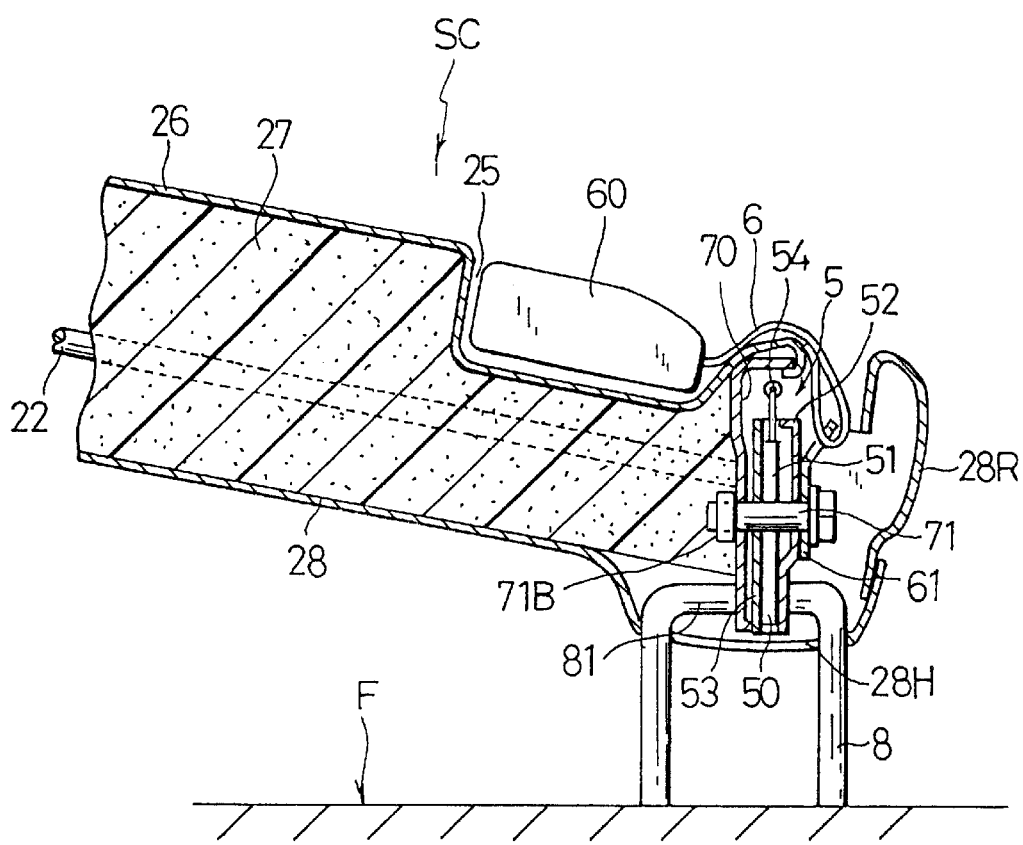
FIG. 6 is a partly broken sectional view of a seat cushion formed on the basis of the seat frame structure, which shows a principal part of the present invention.

The two side frame members (23) have their respective integral lugs (21) (21) each with a connecting hole (21A) forming a pivot point about which the seat cushion frame (2) may be rotated or flipped over, as will be explained later. The seat cushion frame (2) is provided with a return spring (29) (spiral spring) at its forward pivot point (at 21B or 21A) as shown in FIG. 5, by means of which, the seat cushion frame (2) is normally biasingly caused to rotate forwardly in the arrow direction of the FIG. 5 relative to that pivot point. Designations (24) (24) each denotes a support plate extended between the forward and rearward cross frame members (25) (20).

The seat back frame (3) is shown as having a known rectangular configuration provided with a pair of connecting brackets (32) (32) and a central support plate (31).

In assembly, with the upper and lower rails (41) (40) slidably coupled together, the base frame (1) is secured slidably via the slide rail devices (4) to the floor (F). It is noted that the striker (8) erects through the cut-away opened inward area of base frame (1) to a predetermined level thereabove. The two connecting lugs (21) of the seat cushion frame (2) are pivotally connected to the respective two forward brackets (11) of base frame (1). This is done by having inserted the pivot pins (21B) through the aligned holes (11A) (12A) respectively of the forward and rearward brackets (11) (12) and threadedly engaged with a nut (not shown). Therefore, the seat cushion frame (2) is free to rotate about the pivot pins (21B), allowing itself to be flipped over from the base frame (1) in a direction forwardly of the seat frame assembly (SF) (see FIG. 5). On the other hand, the seat back frame (3) is pivotally connected to the two rearward brackets (12). Though not shown, both two connecting brackets (32) of the seat back frame (3) are operatively connected via a reclining device with the two rearward brackets (12), respectively. This is also done by having inserted two pivot pins (12B) through the respective holes (12A) of rearward brackets (12) which are aligned with corresponding holes of the reclining device (not shown) and threadedly engaged with a nut (not shown). Hence, the seat back frame (3) can be adjustably tilted by the reclining device at a desired inclination angle. Further, while not shown, a folding mechanism may be incorporated in the seat back frame (3) so that operating an associated actuator element provided in the top of seat back frame (3) will cause the seat back frame (3) to fold forwardly towards a seat cushion frame (2) or base frame (1), as understandable from the corresponding arrow direction in FIG. 5.

As shown in FIG. 5, according to the illustrated slide rail device (4), the upper rails (41) are normally locked at a relatively foremost point with respect to the lower rails (40), at which point, the seat frame assembly (SF) or seat (S) is positioned at a normal use position where a passenger can sit thereon. While not shown, the slide rail device (4) is in an interlocked relation with the lock mechanism (5) and has a lock member which may be selectively engaged in one of the two lock holes (40A) formed in the lower rail (40), through operation of the lock mechanism (5), to thereby lock and unlock the upper rails (41) to and from the lower rails (40). A forwardly facing one of the two lock holes (40A), as viewed from FIG. 1, is the locking point where the upper rails (41) are locked at the above-noted foremost point relative to the lower rails (40). But, this is not the subject matter of the present invention and any further description thereon is omitted.

As shown in FIG. 1, the lock mechanism (5) and a pair of seat belts (6) (6) each with a belt buckle (60) are provided rearwardly, centrally of the seat cushion frame (2). The lock mechanism (5) is a known type having a latch (50) for releasable engagement with the striker (8), and, as in FIGS. 3 and 5, the lock mechanism (5) includes: a locking plate (51) workable to place the latch (50) in a locked relation with the striker (8); and an unlocking lever unit (55) operatively connected via a cable (54) with the locking plate (51), the unlocking lever unit (55) being mounted on the central support plate (31) of seat back frame (3). Designation (55L) denotes an unlocking lever operable to release the latch (50) from engagement with the striker (8).

It is noted here that the striker (8) is situated at a point in the floor (F) where its horizontal axis portion (81) is engaged with the latch (50) when the upper rails (41) are locked to the lower rails (40) at the aforementioned foremost point (as in FIG. 5).

Figure 2:
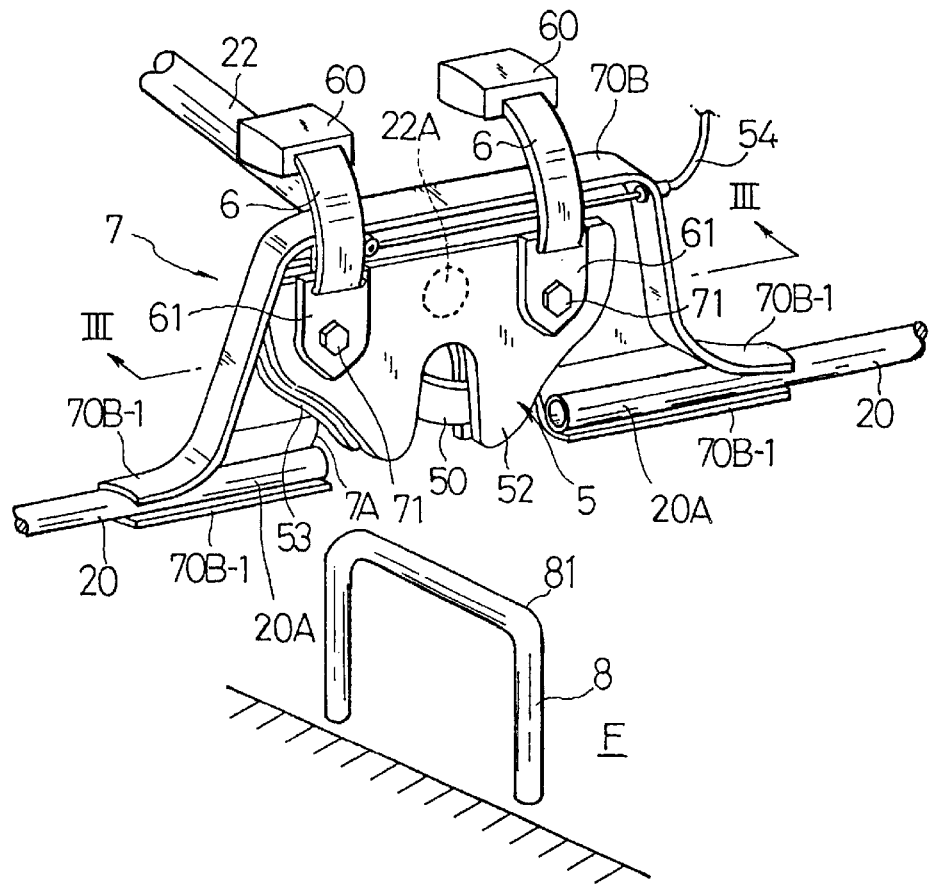
FIG. 2 is a partly broken perspective view showing a principal part of the present invention.
Figure 3:
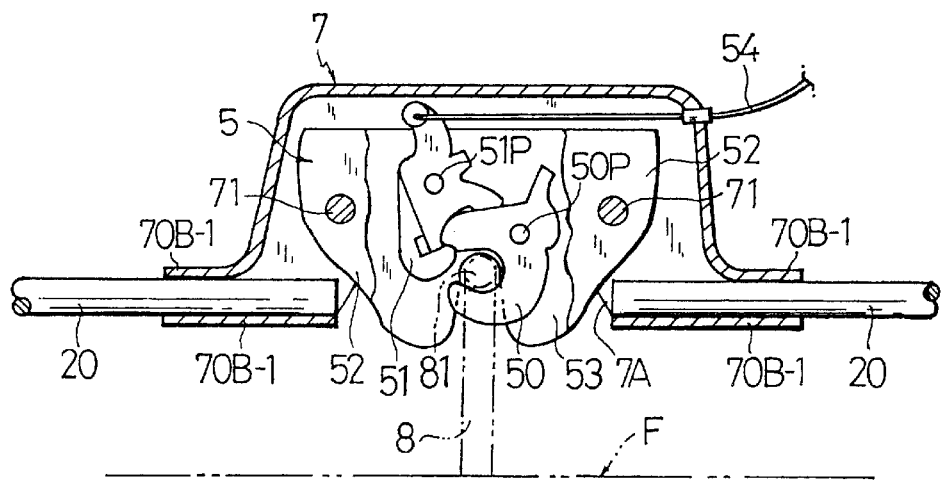
FIG. 3 is a sectional view taken along the line III—III in FIG. 2.
Figure 4:
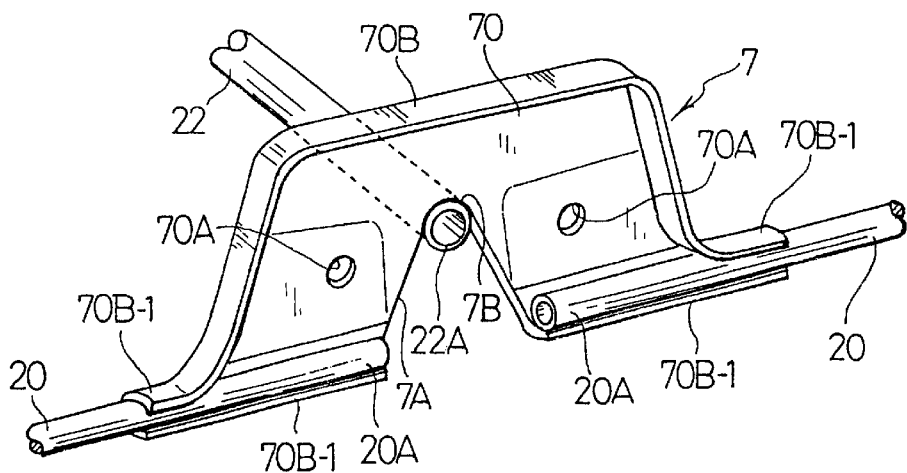
FIG. 4 is a partly broken perspective view showing a base plate connected among cross and longitudinal frame members.

In the illustrated lock mechanism (5), as seen from FIGS. 2 to 4, the latch (50) and locking plate (51) are disposed at the point where the end portions (20A) of two spaced-apart rearward cross frame members (20) face to each other on the coaxial line and where the rearward end (22A) of longitudinal frame member (22) orients in a direction to intersect such coaxial line at a right angle. In this intersection point, an upstanding base plate (7) is provided, having a firm connection with all those end portions (20A, 22A) of three frame members (20, 22). As best shown in FIG. 4, the base plate (7) is basically formed by a vertical planar main body (70) and a pair of outwardly projected connecting portions (70B-1), with an inverted-V-shaped cut-out portion (7A) and a pair of securing holes (70A) (70A) being formed in the main body (70) as illustrated. The cut-out portion (7A) allows the striker (8) to pass therethrough for engagement with and disengagement from the latch (50), and includes a generally inverted-U-shaped top edge (7B) for securely receiving the end (22A) of longitudinal frame member (22) therein. Also, reinforcing angled flanges (70B) are integrally formed in and along the peripheral ends of the main body (70) to add to rigidity of the base plate (7). It is observed that a pair of securing portions (70B-1) (70B-1) are defined integrally in the bottom side of base plate (7) such as to extend continuously from the flanges (70B) in an outward direction opposite to each other. With this structure, the end (22A) of longitudinal frame member (22) is firmly fixed in the top edge (7B) of cut-out portion (7A) as by welding, while the two end portions (20A) of cross frame members (20) are embracingly, firmly held by the two securing portions (70B-1), respectively, whereupon all the longitudinal and cross frame members (22) (20) are firmly connected together by the base plate (7). It will be appreciated that the two cross frame members (20) are situated below the longitudinal frame member (22), hence providing a firm support for receiving a substantive region of the lower portion of base plate (7) because the two securing portions (70B-1) of base plate (7) offer a relatively long area to embracingly retain the substantive axial regions of the cross frame member end portions (20A), so that the base plate (7) per se is stably and firmly attached to the seat cushion frame (2), while being also at the upper region thereof firmly supported by the longitudinal frame member (22).

As shown in FIGS. 2 and 3, securely attached to the foregoing base plate (7) are the lock mechanism (5) and two seat belts (6). Specifically, as stated earlier, the lock mechanism (5) includes the latch (50) and locking plate (51) which are shown in FIG. 3 to be rotatably journalled at the respective two pins (50P) (51P) between a pair of first and second support plates (52) (53), wherein the first support plate (52) faces toward a side rearwardly of the seat cushion frame (2) while the second plate (53) toward a side forwardly the same (2). Though not shown, each of those two support plates (52) (53) has a pair of spaced-apart securing holes which are respectively aligned with the above-stated two securing holes (70A) of base plate (7). Further, attached firmly upon the first support plate (52) are a pair of anchor members (61) (61) each having a securing hole (not shown) which is of course respectively aligned with the afore-said paired securing holes associated with the support and base plates (52, 53, 7). As shown, each of two seat belts (6) are at its lower end connected with the respective two anchor members (61) which are formed from a rigid metallic material.

Thus, with two securing bolts (71) (71) passed respectively through the foregoing aligned paired securing holes and threadedly secured by nuts (71B) (see FIG. 6), both lock mechanism (50) and seat belts (6) are securely fastened on the base plate (7) in an integral manner.

As shown in FIG. 3, according to the lock mechanism (5), the latch (50) is normally biased by a spring (not shown) in a direction to engage over the striker (8), and drawing the unlocking lever (55L) will cause rotation of the locking plate (51), which in turn causes the latch (50) to rotate and disengage from the striker (8), overcoming the biasing force of the spring. But, those latch and locking plate are known in the art and any detailed explanation thereon is omitted.

FIG. 5 illustrates a vehicle seat (S) finally produced by upholstering the above-described seat frame assembly (SF). That is, the vehicle seat (S) is comprised of a seat cushion (SC) and a seat back (SB), which are each formed by upholstering the seat cushion frame (2) and seat back frame (3), respectively, wherein, needless to mention, both seat cushion (SC) and seat back (SB) are pivotally mounted upon the base plate (1) fixed on the slide rail devices (4). In particular, as can be seen from FIG. 6, the seat cushion (SC) is of such an upholstery structure that comprises: a top skin layer (26) forming an upper seating surface; a foam padding layer (27); and a back cover (28) (preferably of a synthetic resin material) forming a bottom wall (SC-1). Also, formed in the upper seating surface of seat cushion (SC) is a recession (25) in which both seat belts (6) and buckles (60) can be stored. The recession (25) is disposed in the rearwardly facing area of seat cushion (SC) adjacent to the base plate (7) from which the seat belts (6) extend short, so that the relatively short seat belts (6) can readily be extended into the recession (25) and at the same time, the buckles (60) can be stored and held in the recession (25).

A rear end cover portion (28R) is provided continuous from the back cover (28) so as to cover the whole rear end of the seat cushion (SC) as well as the base plate (7), support plates (52, 53) and anchor members (61). As shown, the cover potion (28R) has a slit-like opening (28H) formed in the bottom wall thereof. This opening (28H) allows ingress and egress of the striker (8) therethrough into and from the inside of cover portion (28R), whereby the latch (50) may be engaged with the striker (8) when the seat cushion (SC) is set in the normal use position shown in FIG. 5, or can be disengaged from the striker (8) when the seat cushion (SC) is flipped over forwardly in the arrow direction of FIG. 5.

As constructed above, upon rotative operation of the unlocking lever (55L) located in the rear side of seat back (SB), the latch (50) of lock mechanism (5) is caused to rotate and disengage from the striker (8), whereupon the seat cushion (SC) is automatically flipped over about the pin (21B) in the forward direction of arrow in FIG. 5 under the biasing force of spring (29) to a generally upright position (not shown), while simultaneously the slide rail devices (4) are placed in an unlocked state (i.e. the upper rails (41) are unlocked from the lower rails (40)), due to the slide rail devices (4) being interlocked with the lock mechanism (5) as previously stated. This unlocking operation permits fore-and-aft adjustment of the seat (S). Next, now that the slide rail devices (4) are in unlocked state, a user or passenger can keep grasping the unlocking lever (55L) and draw it backwardly to thereby slide the seat (S) in the backward direction via the slide rail devices (4). As a result thereof, though not shown, there is obtained a widened space forwardly of the seat (S), thereby allowing the seat cushion (SC), which is in the upright state, to be folded forwardly into a reversed flat state where the bottom wall (SC-1) thereof is exposed outwardly and lies in a parallel relation with the base frame (1).

Then, as understandable from the arrows in FIG. 5, the seat back (SB) may also be folded by the user or passenger forwardly onto the base frame (1) and transformed into a reversed flat state where the rear wall (SB-1) of seat back (SB) is exposed outwardly. Thus, it will be understood that both seat cushion bottom wall (SC-1) and seat back rear wall (SB-1) are placed substantially in registry with each other, to thereby assume a full-flat seat configuration which may be used as a cargo load floor or load-carrying platform.

From the description made thus far, it is appreciated that the present invention is endowed with the following advantages:

(i) In the case of collision or sudden deceleration, a great load, applied to the seat (S) from an occupant thereon who is restrained by the seat belts (6), is imparted via the seat belts (6) and then quickly escaped through the latch (50) and striker (8) down to the vehicle floor (F) (i.e. a vehicle body). Thus, the great load is directly exerted upon the floor (F) or vehicle body, not causing any damage to the seat cushion (SC).

(ii) As discussed above, a great load input through the seat belts (6) is directly exerted upon the vehicle body, which effectively eliminates the need for reinforcing the whole of slide rail devices (4) and seat cushion (SC) as found in the prior art. Therefore, the weight of seat (S) is made lighter than the conventional seats.

(iii) The provision of seat belts (6) on the seat cushion frame (2) or seat cushion (SC) insures to not only make the seat belt (6) per se readily accessible to a user or passenger even when he or she is adjusting the fore-and-aft position of seat (S) and/or folding the seat cushion (SC) and seat back (SB), but also preclude the seat belts from being fallen down through the seat during that seat arranging work. This assuredly avoids the troublesome necessity for the user or passenger to find and reach the seat belts fallen or missing through the seat cushion and seat back as is often the case with the prior-art folding seats.

(iv) The base plate (7), on which the latch (50) and seat belts (6) are mounted, is firmly connected among the three frame members (22, 20, 20), hence providing a far increased strength against the great load, due to the fact that the load is dispersed into the wide vertical wall of base plate (7) and further into those three frame members, which is greatly effective in preventing an intensive exertion of the load upon the lock mechanism (5) and support plate (7). Therefore, those mechanical elements (5, 7) are protected against undesired deformation. This also contributes to smooth and positive escape of the great load to the vehicle body side or vehicle floor (F).

Finally, it should be understood that the above-described seat cushion frame structure and arrangement of the locking mechanism, striker and seat belts may be applied to other kinds of seat than the full-flat-type fold-down seat, and that the present invention is not limited to the illustrated embodiment, but any other modifications, replacements and additions may be structurally applied thereto without departing from the scopes of the appended claims.

What is claimed is:

1. A structure of a seat in combination with a vehicle having a floor, comprising:

a pair of side rail devices including a lower rail fixed on said floor and an upper rail slidably engaged with said lower rail;

a base frame integrally fixed to said upper rail, said base frame having a forward end facing to a side forward of the seat;

a seat cushion frame pivotally connected with said forward end of said base frame so as to be rotatable forwardly and backwardly relative to the forward end, said seat cushion frame having a rearward area facing to a side rearward of the seat;

a striker means fixedly provided on said floor, said striker means including a portion extending along a longitudinal direction of said floor and vehicle;

a lock mechanism for locking and unlocking said seat cushion frame to and from said striker means, said lock mechanism being provided in said rearward area of said seat cushion frame in such a manner as to be disposed centrally of the seat cushion frame and extending in a direction orthogonal to said longitudinal direction of the floor and vehicle, wherein the lock mechanism includes a lock means movable in a direction transversely of said portion of said striker means for engagement therewith and disengagement therefrom; and a pair of seat belts securely connected with said lock mechanism so as to be disposed symmetrically relative to said lock means.

2. A structure of a seat in combination with a vehicle having a floor, comprising:
- a pair of side rail devices including a lower rail fixed on said floor and an upper rail slidably engaged with said lower rail;
- a base frame integrally fixed to said upper rail, said base frame having a forward end facing to a side forward of the seat;
- a seat cushion frame pivotally connected with said forward end of said base frame so as to be rotatable forwardly and backwardly relative to the forward end, said seat cushion frame having a rearward area facing to a side rearward of the seat and including a cross frame member and a longitudinal frame member extending in a direction transversely of said cross frame member;
- a vertically extending base plate firmly connected with said cross and longitudinal frame members in said rearward area of the seat cushion frame at a point centrally of the seat cushion frame;
- a striker means fixedly provided on said floor, said striker means including a portion extending along a longitudinal direction of said floor and vehicle;
- a lock mechanism for locking and unlocking said seat cushion frame to and from said striker means, said lock mechanism being provided in said rearward area of said seat cushion frame in such a manner as to be disposed centrally of the seat cushion frame and extending in a direction orthogonal to said longitudinal direction of the floor and vehicle, wherein the lock mechanism includes a lock means moveable in a direction transversely of said portion of said striker means for engagement therewith and disengagement therefrom; and
- a pair of seat belts securely connected with said lock mechanism so as to be disposed symmetrically relative to said lock means.

3. The structure of seat according to claim 2, wherein said vertically extending base plate has a lower end portion, and wherein said cross frame member is fixedly secured to said lower end portion of the vertically extending base plate, whereas said longitudinal frame member is fixedly secured to a region of the vertically extending base plate, said region being defined above said lower end portion.

* * * * *